Figure 1:
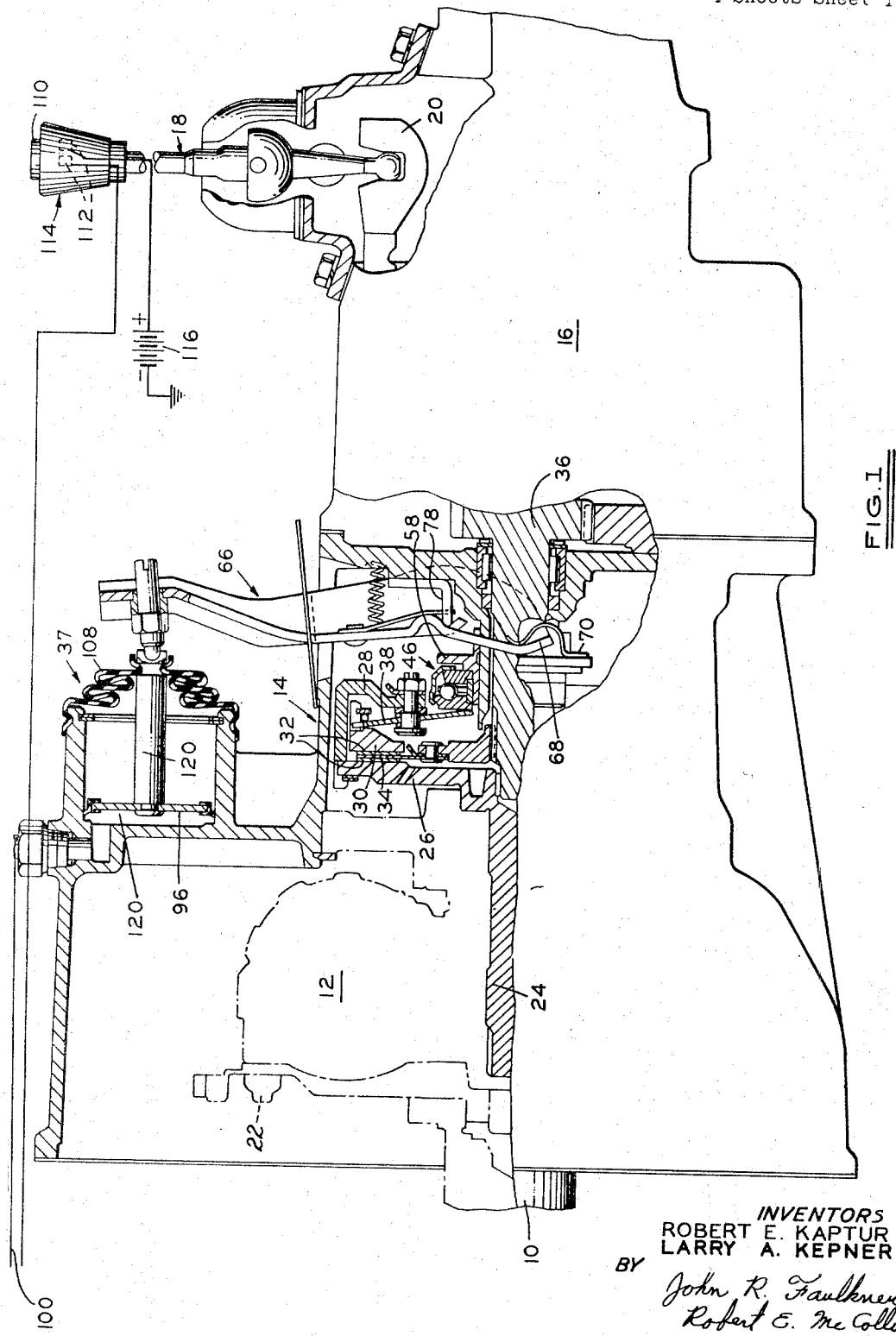

May 30, 1967 R. E. KAPTUR ETAL 3,322,248
MOTOR AND GEARING CONTROLS OPERATE THE CLUTCH FLUID CONTROLS
Filed July 27, 1965 4 Sheets-Sheet 1

INVENTORS
ROBERT E. KAPTUR
LARRY A. KEPNER
BY
John R. Faulkner
Robert E. McCollum
ATTORNEYS

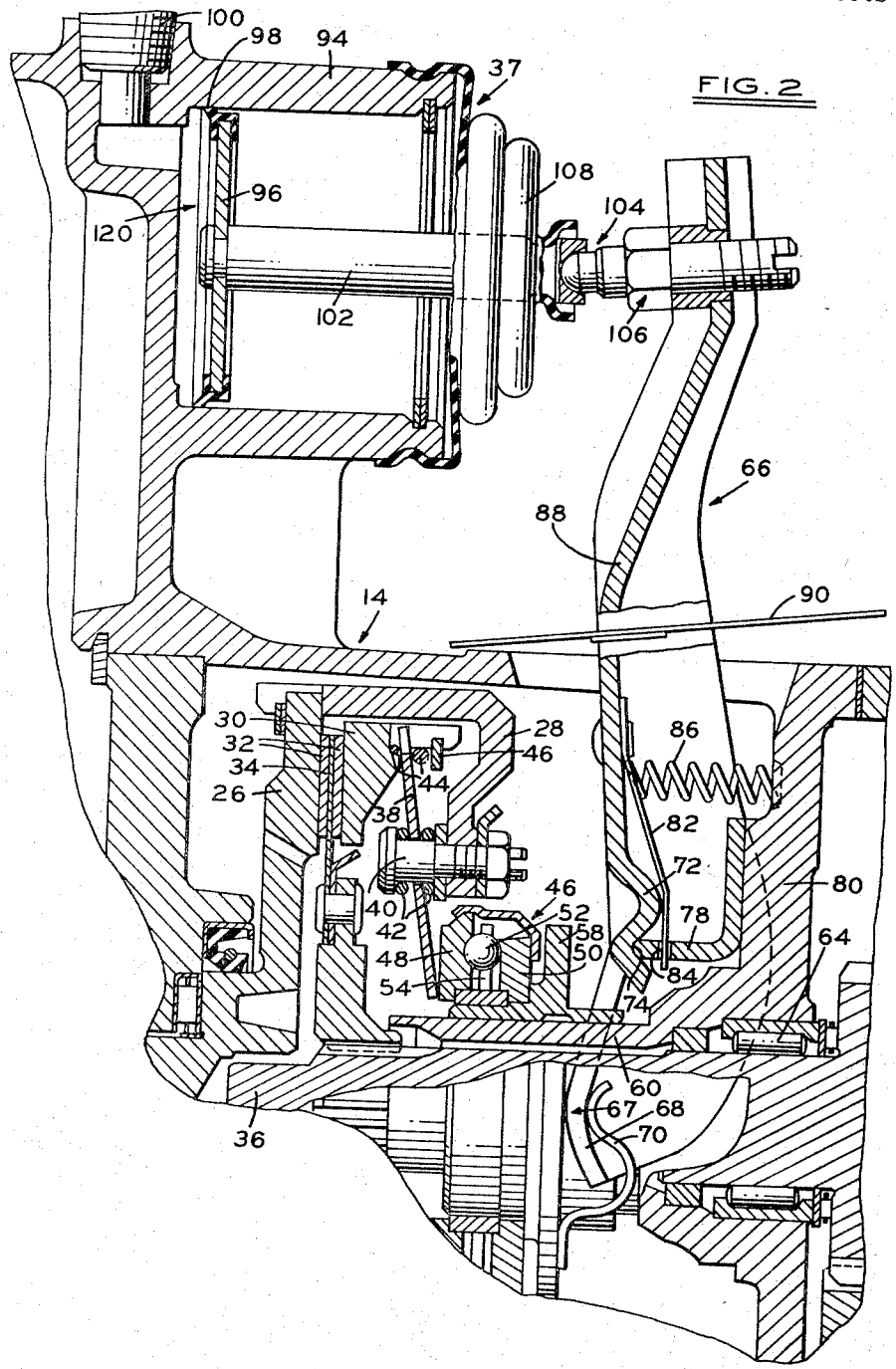

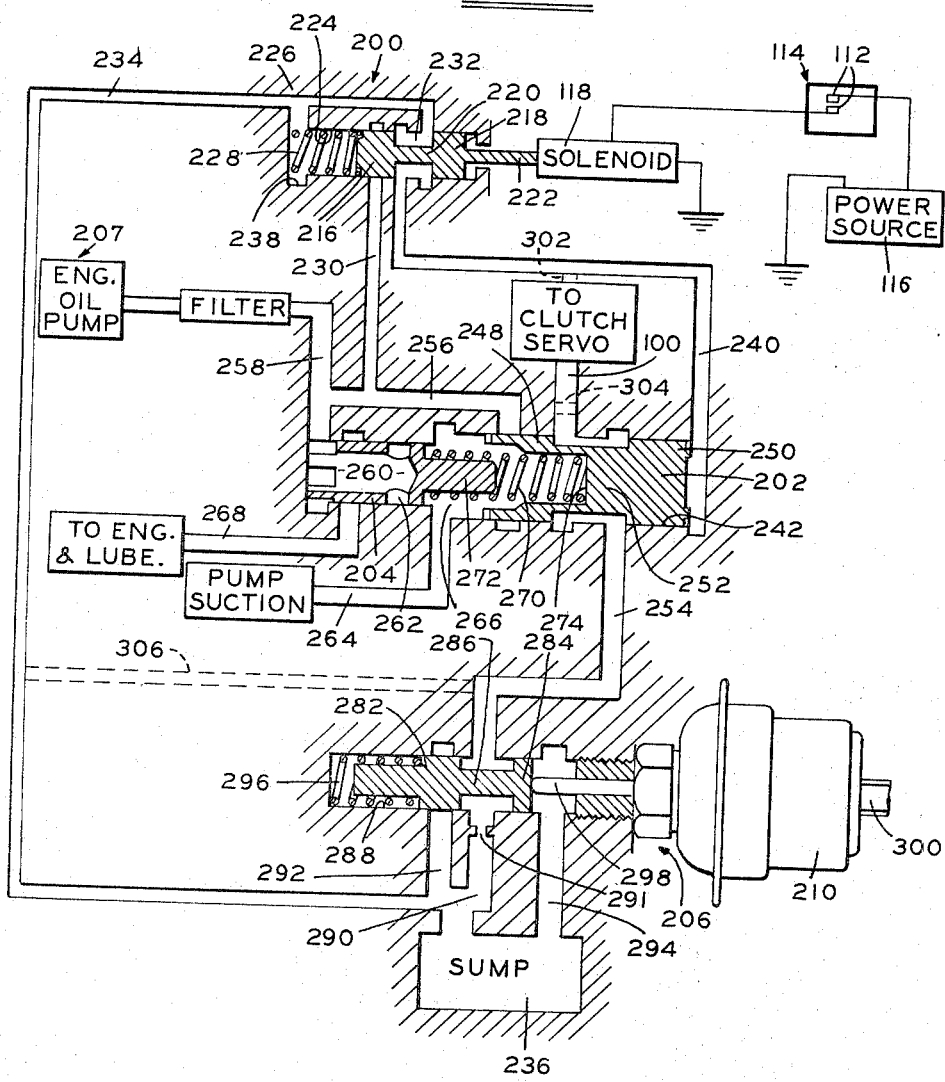

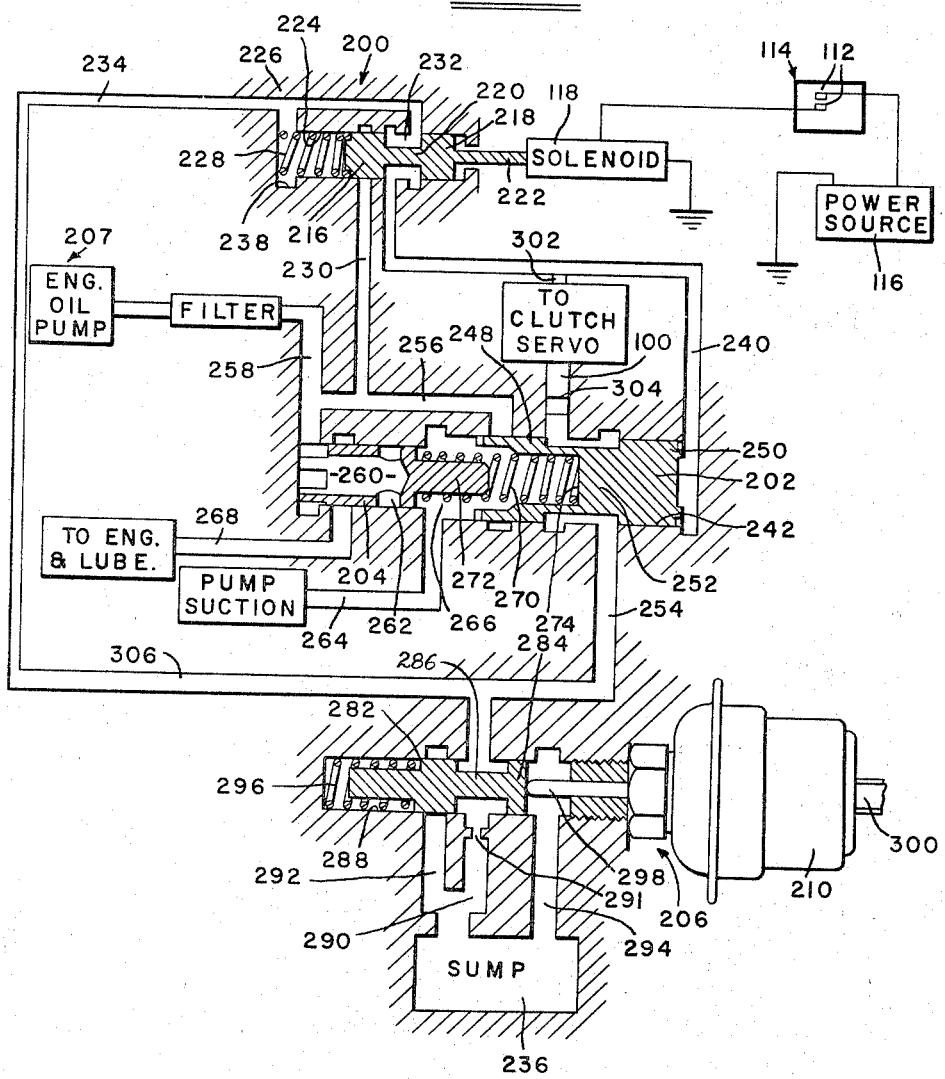

United States Patent Office 3,322,248
Patented May 30, 1967

3,322,248
MOTOR AND GEARING CONTROLS OPERATE
THE CLUTCH FLUID CONTROLS
Robert E. Kaptur, Birmingham, and Larry A. Kepner,
Dearborn, Mich., assignors to Ford Motor Company,
Dearborn, Mich., a corporation of Delaware
Filed July 27, 1965, Ser. No. 475,117
25 Claims. (Cl. 192—3.5)

The invention relates in general to a friction coupling control. More particularly, it relates to a fluid pressure control system that is semi-automatic in operation, and controls the engagement and disengagement of a clutch between the engine and transmission of a motor vehicle.

Most motor vehicles that are equipped with a standard or manually shiftable type transmission have a mechanically actuated clutch between the engine and transmission to permit the driver to change the gear ratio. Obviously, with a drive system of this type, frequent depression of the conventional clutch pedal, in heavy traffic, for instance, will soon fatigue the driver.

One of the primary objects of the invention, therefore, is to provide a driveline clutch that is power controlled at the will of the operator.

Another object of the invention is to provide a fluid pressure control system for such a clutch that operates automatically after initial activation.

A further object of the invention is to control the clutch re-engagement rate as a function of the change in torque demand on the engine to coordinate the operation of the clutch with the particular engine load conditions.

Another object of the invention is to provide a clutch control system that is simple in construction and operation, is economical to manufacture, and is controllable by the driver.

A further object of the invention is to provide a clutch servo fluid pressure control system that makes use of the conventional engine oil pump for its source of fluid. This eliminates the need for an additional fluid pump in the system, and thereby lowers the total cost of the system and the additional maintenance that would normally be required.

A further object of the invention is to provide a fluid pressure control system including a pilot valve that moves in response to depression or release of a gearshift lever mounted push button, either to effect the application of actuating fluid on a clutch release servo mechanism, or to drain the servo to a sump through a valve mechanism that variably restricts the servo line in accordance with changes in torque demand on the engine to control the re-engaging movement of the clutch.

It is a still further object of the invention to provide a clutch control system of the type above in which: the fluid to the clutch servo is further controlled by a shift valve actuated by fluid from the pilot valve; the shift valve is associated with an engine oil and lubrication regulating valve; and, the regulating valve is temporarily moved to a closed position when the shift valve moves to supply fluid to the clutch servo, and remains there until the servo piston has stroked and the pressure build-up is sufficient to again move the regulating valve to its regulating position.

It is also an object of the invention to provide a clutch with a control system in which the fluid from the clutch servo either exhausts freely to the sump to provide quick clutch re-engagement, or passes through an orifice in a parallel line to provide slower clutch re-engagement, the path being determined by a valve that moves as a function of the changes in engine intake manifold vacuum. Thus, when the driver wishes to change the gear ratio under load, when the vacuum is low and load/torque demand is high, the exhaust servo line will be relatively wide-open to permit a quick re-engagement of the clutch; conversely, when the load/torque demand is low and vacuum high, such as when the vehicle is idling or cruising, the clutch exhaust line will be slowly vented through the orifice so that the clutch will be gradually re-engaged.

Other objects, features and advantages of the invention will become apparent upon reference to the succeeding, detailed description thereof, and to the drawings illustrating the preferred embodiments thereof; wherein, FIGURE 1 shows a side-elevational view, with parts broken away and in section, of the clutch, clutch control and gearshift control mechanism for a motor vehicle embodying the invention;

FIGURE 2 is an enlarged view of a portion of the FIGURE 1 showing;

FIGURE 3 schematically illustrates a fluid pressure control system for controlling the operation of the clutch of FIGURES 1 and 2; and FIGURE 4 schematically illustrates a modification of the FIGURE 3 showing.

FIGURE 1, which is essentially to scale, shows a side-elevational view of the transmission section of a motor vehicle having a standard or manually shiftable type transmission. Parts are broken away and in section at the locations pertinent to the invention. Further details are not shown, as they are known and believed to be unnecessary for an understanding of the invention.

The transmission has a power input shaft 10, which is usually a part of the crankshaft of an internal combustion engine, not shown. The transmission, in this particular illustration, includes a hydraulic torque converter 12, shown in phantom lines, a dry friction driveline clutch assembly 14, a section 16 containing a countershaft or similar manually shiftable type transmission, and an operator movable gearshift lever 18. The gearshift lever engages a shift rod 20 that generally moves one of the synchronizers (not shown) in the transmission.

More specifically, crankshaft 10 is connected by a flywheel 22 to the rotatable impeller shell of torque converter 12. The torque converter may be of a known type having one or more pumps, turbines, and stators, and operates in a known manner to transmit and multiply the torque of input shaft 10 to its turbine. The turbine is splined to one end of an intermediate shaft 24 that is formed at its opposite end with a disc 26. The disc constitutes the power input portion of driveline clutch 14. Disc 26 has a generally L-shaped annular extension 28 within which an annular presser plate 30 is axially slidable splined. The adjacent faces of plate 30 and disc 26 cooperate with the friction faces 32 of a driven disc 34 that is splined at its hub, as shown, to a transmission power input shaft 36.

Clutch 14 is spring engaged, and is disengaged by a power servo mechanism 37. As more clearly seen in FIGURE 2, an annular Belleville type spring member 38 normally biases presser plate 30 against disc 34 and the two against drive disc 26. Spring 38 is pivotally retained on the shank of a pin 40, and between two pivot rings 42. The outer peripheral portion of spring 38 is confined between two pivot rings 44 located in a groove defined by disc 30 and a snap ring 46. The spring is constructed so that in the unsprung position shown, it exerts a force against presser plate 30 that is sufficient to clamp disc 34 against drive disc 26 and thereby cause transmission input shaft 36 to be driven essentially at engine speed.

The inner peripheral portion of Belleville spring 38 is abutted by a release or throw-out bearing 46 of a known construction. The bearing has two race portions 48 and 50 separated by a plurality of balls 52 confined within an annular cage 54. The left-hand race portion 48 frictionally engages the end of spring 38, and can, therefore, rotate at the speed of disc 26 when clutch 14 is engaged. The hub of race portion 50 is joined to a flange or disc 58 that is axially slidably mounted on a stationary sleeve shaft 60. The sleeve shaft is fixed or secured to the transmission housing, and separated from input shaft 36 by a suitable bearing 64.

The leftward movement of throw-out bearing 46 disengages clutch 14 by flattening spring 38 against the head of pin 40. The flattening of the spring moves presser plate 30 to the right and disengages disc 34 from disc 26. The sliding movement of throw-out bearing 46 is controlled by a lever indicated generally at 66.

Lever 66 is essentially a U-shaped stamped member with a yoke 67 at its lower end. The yoke 67 provides fingers 68 that straddle input shaft 36 and bear against opposite sides of the annular flange or plate 58 on throw-out bearing 46. The fingers are retained against plate 58 by spring clips 70 secured to the plate.

The peripheral edge 72 of yoke 67 is channeled to an S-like shape in cross section to provide a socket 74 near the center of the yoke for the end of a horizontally extending plate member 78. The plate is bolted to an extension 80 of sleeve shaft 60. Socket 74 and plate 78 together constitute a fulcrum for pivotal movement of lever 66. A keeper spring 82 is riveted to lever 66, and projects through a slot 84 in flange 78 to maintain the lever in engagement with the plate. Another spring 86 is seated between stationary portion 80 and lever 66 to bias the lever against throw-out bearing plate 58.

The upper portion 88 of lever 66 extends out of the transmission case through an adapter plate 90 and is adapted to be rocked back and forth about the pivot 74, 78 by the fluid pressure servo 37. The servo may be of a known type, and includes a cylinder 94, and a piston 96 slidably and sealingly mounted in it. The cylinder may be bolted to or formed integral with the transmission housing. It is open to the atmosphere at one end 98, and connected at its opposite end to a fluid pressure line 100. A rod 102, secured to piston 96, has a ball and socket type universal connection 104 with an adapter 106 fixed to the end of lever 66. A suitable bellows 108 covers the open end of cylinder 94 and prevents the entry of dust and other foreign matter.

FIGURE 1 shows the manually actuated gearshift lever 18 provided with a spring released push button 110, which, when actuated, bridges the contacts 112 of a switch 114. The switch is part of an electrical circuit from the vehicle battery or generator 116 to a solenoid 118 (FIGURE 3), which, when energized, directs fluid under pressure through servo line 100 to servo chamber 120 to disengage clutch 14. When button 110 is released and switch 114 opens, servo line 100 is vented to a sump, permitting Belleville spring 38 to return clutch 14 to its engaged position.

The fluid pressure control system shown in FIGURE 3 provides automatic disengagement and engagement of clutch 14 merely by the depression and release of the gearshift lever mounted push button 110. As will be described, it also provides automatic control of the rate of re-engagement of the clutch as a function of the torque demand on the engine.

The control system includes a pilot valve 200, a shift or booster valve 202, an engine oil and lubrication regulating valve 204, and a clutch servo exhaust line control valve 206. The fluid under pressure for filling the system and for operating the clutch servo is supplied by the conventional engine driven oil pump 207.

Pilot valve 200 is of the spool type, and has a pair of spaced lands 216 and 218 connected by a neck portion 220 of reduced diameter. It also has a stem portion 222 that constitutes the armature of solenoid 118. The valve is slidably mounted within the bore 224 of a valve body 226, and is biased to one end by a spring 228. In this position, land 216 blocks a fluid pressure supply line 230 connected to pump 207 through a filter, and connects the annular chamber 232 formed between lands 216 and 218 to an exhaust line 234 leading to a sump 236. Line 234 is also connected at all times to the enlarged diameter end 238 of pilot valve bore 224. Chamber 232 is further connected to a line 240 leading to the end of a stepped diameter bore 242 containing the shift valve 202 and regulating valve 204.

Shift valve 202 is also of the spool type, and has spaced lands 248 and 250 connected by a neck portion 252 of reduced diameter. The fluid annulus 254 defined between the neck portion and valve body is connected at one edge to the clutch servo line 100 (see also FIGURE 2), and at its opposite edge to a drain line 254. Bore 242 is also connected by a line 256 to line 230, and to the pump 207 and opposite end of the bore by a line 258.

Regulating valve 204 has a central bore 260 open at all times to the fluid in line 258. It also has a cross-bore 262 that connects at times with a pump suction or inlet line 264 also connected to the space 266 between the valves. A further engine oil and lubricating line 268 is provided for connection with line 258 when the pressure of the fluid acting against the end of the valve is sufficient to move it to interconnect the two.

The regulating and shift valves 204 and 202 are biased to the positions shown by a spring 270. The spring surrounds a guide stem 272 on valve 204, and is seated at its opposite end in a recess 274 in valve 202. Since the oil pump supplies all of the requirements of oil to the engine and to the various lubrication stations, as well as the requirements of the control system, at low engine speeds, the capacity of the pump may be insufficient to fully satisfy the control system within the short period of time preferred for efficient clutch operation. It is for this reason that the shift and regulating valves 202 and 204 are axially aligned and separated by spring 270, so that when shift valve 202 moves to admit fluid under pressure to clutch servo 37, the regulating valve 204 will be temporarily closed until the servo piston has stroked and the increase in fluid pressure in the lines again is sufficient to move regulating valve 204 to its open or regulating position.

Dump valve 206 is also of the spool type, and has spaced lands 282 and 284 connected by a neck portion 286 of reduced diameter. The valve is slidably mounted in a bore 288 in the valve body. The bore is connected to a sump 236 either through a line 290 containing an orifice 291, or through an unrestricted line 292. A further line 294 connects one end of the bore to the sump. A spring 296 normally biases valve 206 against the ends of a plunger 298 secured to a diaphragm (not shown) in a vacuum servo assembly 210.

Assembly 210 is of a known type. Although not shown, it would contain the diaphragm described, which would divide the housing into an air chamber on the left, and a vacuum chamber on the right. The air chamber would be open to the atmosphere through a vent, while the vacuum chamber would be connected by a conduit 300 to the intake manifold of the internal combustion engine, also not shown. The assembly would include a spring inserted between the diaphragm and the right end of the housing so that at high engine vacuum, the diaphragm spring will exert a net minimum force against plunger 298, permitting valve 206 to be moved to the position shown by the force of spring 296. Conversely, when the vacuum is at a minimum, substantially the maximum force of the diaphragm spring will force plunger 298 and valve 206 to the left as far as possible, and connect exhaust lines 254 and 292.

In over-all operation, with the vehicle at rest, the clutch 14 (FIGURES 1 and 2) is in the position shown. To start the engine, the driver places the gearshift lever 18 in neutral, and turns on the ignition. When the engine starts, oil pump 207 will rotate and build up a fluid pressure in line 258 sufficient to move regulating valve 204 to the right against the force of spring 270 to first crack open line 268 and supply the engine and lubricating lines with oil. Continued rightward movement of the valve, as the pressure build-up continues, moves the valve to connect bore 260 and suction line 264. The valve will then move back, and assume an equilibrium position regulating the pressure in line 258 and supplying oil to line 268.

When a gear ratio change is desired, the operator depresses push button 110, which closes switch 114 and energizes solenoid 118. This moves pilot valve 200 to the left to connect supply line 230 to shift valve actuating line 240. Fluid under pressure now acting on the end area of shift valve 202 then moves this valve to the left to connect the clutch servo line 100 to supply line 256.

Simultaneously, the movement of shift valve 202 and the force of spring 270 cause the regulating valve 204 to seat and temporarily block flow of oil to line 268. This permits all of the output of the engine oil pump to be supplied to fill the control system lines and clutch servo chamber 120 to move piston 96 to the right in FIGURE 1. This causes throwout lever 66 to pivot clockwise about plate 78 and move throwout bearing 46 to the left to flatten Belleville spring 38. Presser plate 30 is thus moved to the right to release the driven disc 34 from drive disc 26. The clutch is now disengaged, and a gear ratio change can be made in the transmission. As soon as the servo piston 96 has stroked, the build-up of pressure in line 258 will again move regulating valve 204 to its regulating position to supply oil to line 268.

When the gear ratio change has been completed, the operator releases button 110, which opens switch 114 and deenergizes solenoid 118. This permits pilot valve spring 228 to move the valve to the position shown, blocking off the connection between lines 230 and 240, and connecting line 240 to the sump through line 234. With fluid under pressure no longer in line 240, the force of engine oil against regulating valve 204 and the force of spring 270 now moves shift valve 202 to the position shown to connect clutch servo line 100 to exhaust line 254.

If, at this time, a high engine load condition exists, and, therefore, the vacuum acting on the diaphragm in assembly 210 is low, the dump valve 206 will be moved to the left by the diaphragm spring (not shown) to connect lines 254 and 292. A quick exhaust of the fluid in line 100 will then occur, permitting a quick return of piston 96 to the left by the action of Belleville spring 38. A quick reengagement of clutch 14 thus occurs.

If the vacuum acting in assembly 210 is high, indicating a low load condition of operation and low torque demand condition, valve 206 will be moved by spring 296 to the position shown in FIGURE 3 to connect lines 254 and 290. This causes a slow exhaust of the fluid in servo line 100 through the orifice 291, thus causing a slow return of piston 96 to the left and a resultant smooth reengagement of clutch 14.

It will be clear that the variable changes in engine intake manifold vacuum will variably position the dump valve 206 between the extreme positions described to vary the rate of clutch re-engagement as a function of the position of plunger 298 and valve 206.

It will also be clear that while the dump valve is controlled by a vacuum diaphragm type assembly, the valve could also be controlled by throttle valve pressure in a known manner. That is, some transmission controls utilize a regulating valve connected to the accelerator pedal so that depression of the pedal produces a signal pressure that increases upon continued depression of the pedal. This changing throttle valve pressure could be applied to the end of plunger 298 so that the plunger would move in the same manner as previously described.

A further alternative construction would be to provide a throttle valve signal pressure force acting on plunger 298. The changing throttle valve pressure would be produced by a movement of a throttle pressure valve controlled by a vacuum diaphragm that again is moved as a function of the changes in intake manifold vacuum. The two throttle pressure valve constructions described are known in the prior art, and are fully shown and described as valves 94 and 192, respectively, in U.S. 3,280,646, and their details are therefore not given.

In order to provide a still faster disengagement of clutch 14, the fluid under pressure from pump 207 may be connected directly to servo chamber 120 through line 240 after the pilot valve has moved sufficiently and without waiting for shift valve 202 to move to the left. This alternate construction is indicated in FIGURE 4 by the dotted lines 302 between the clutch servo line 100 and shift valve supply line 240. In this case, the lower portion of line 100 would be blocked off as indicated by the dotted lines 304. The shift valve 202 would still serve the function of temporarily seating the regulating valve 204 when the clutch servo is supplied with fluid, so that the engine oil pump flow would be sufficient at this time to immediately stroke the servo piston 96. The only other changes for this particular embodiment would be the manner in which servo chamber 120 is exhausted. Line 100 would be drained through lines 240 and 234, when the pilot valve is in the position shown, and line 234 would be connected to line 254 by the dotted line 306, instead of bypassing the drain valve 206, as shown.

From the foregoing, it will be seen that this invention provides a semi-automatic control for a motor vehicle driveline clutch that automatically disengages and re-engages the clutch upon depression and release of a push button on the gearshift lever, without the necessity of depressing the conventional clutch pedal. It will also be seen that the semi-automatic control system provides a clutch re-engagement rate that varies as a function of the changes in engine intake manifold vacuum so as to be indicative of changes in engine load or torque demand on the engine. It will further be seen that the invention provides a power clutch control for a manually controlled transmission that is more simplified in construction and economical to manufacture than conventional fully automatic transmissions.

While the invention has been illustrated in its preferred embodiments in the figures, it will be clear to those skilled in the arts to which the invention pertains that many changes and modifications may be made thereto without departing from the scope of the invention. It will also be clear that while the control described and illustrated refers to a clutch, it will be equally applicable to a brake, or similar coupling member.

What is claimed is:

1. A fluid pressure control system, comprising, an actuatable means biased to one position and movable by fluid under pressure acting thereon to a second position, a fluid supply line, a rotatable source of fluid under pressure providing an output fluid pressure that varies as a function of its speed of rotation, first and second conduit means connecting said source to said supply line and actuatable means, respectively, and control means in said conduit means for controlling the flow of fluid to said supply line and actuatable means, said control means including first and second movable open-close flow control means in said first and second conduit means, respectively, said first control means being responsive to a predetermined source pressure acting thereon to open said first conduit means, means moving said second control means, to open said second conduit means, and means operably connecting said first and second control means whereby movement of said second control means effects movement of said first control means to close said first conduit means until the attainment of a higher predetermined source pressure again opens said first conduit means.

2. A fluid pressure control system, comprising, an actuatable means biased to one position and movable by fluid under pressure acting thereon to a second position, a fluid supply line, a rotatable source of fluid under pressure providing an output fluid pressure that varies as a function of its speed of rotation, first and second conduit means connecting said source to said supply line and actuatable means, respectively, and control means in said conduit means for controlling the flow of fluid to said supply line and actuatable means, said control means including a pressure relief valve operable at a low pressure from said source and an open-close flow control shift valve each in one of said conduit means controlling the flow therethrough and operably connected whereby movement of said shift valve to open its conduit means effects a closing of said previously open relief valve until the attainment of a higher source pressure upon continued rotation of said source again opens said relief valve.

3. A fluid pressure control system, comprising, an actuatable means biased to one position and movable by fluid under pressure acting thereon to a second position, a fluid supply line, a rotatable source of fluid under pressure providing an output fluid pressure that varies as a function of its speed of rotation, first and second conduit means respectively connecting said source to said supply line and actuatable means, and flow control means in said conduit means for controlling the flow of fluid to said supply line and actuatable means, said control means including a pair of valves each movable by fluid under pressure acting thereagainst from said source from a first to a second position respectively blocking flow through or opening its respective conduit means, yieldable force transmitting means operably connecting said valves for transmitting the movement of one to the other at times, the fluid in said first conduit means acting on one of said valves moving it to its second position, and means moving the other of said valves to its second position, the latter movement of said other valve effecting a return movement of said one valve to its first position to temporarily block flow to said supply line, the subsequent build-up in pressure in said conduit means upon continued rotation of said source moving said one valve again to its second position.

4. A control system as in claim 3, said means moving the other of said valves including a third selectively movable open-close pilot valve controlling flow from said source to an end portion of said second valve through a third conduit means, and means moving said third valve to effect movement of said second valve by the fluid pressure acting thereon in said third conduit means.

5. A control system, as in claim 4, said means for moving said third valve including a solenoid, and operator controlled switch means to activate said solenoid to move said pilot valve to open said third conduit means.

6. A fluid pressure control system, comprising, an actuatable means biased to one position and movable by fluid under pressure acting thereon to a second position, a fluid supply line, a rotatable source of fluid under pressure providing an output fluid pressure that varies as a function of its speed of rotation, first and second conduit means respectively connecting said source to said supply line and actuatable means, and flow control means in said conduit means for controlling the flow of fluid to said supply line and actuatable means, said control means including a pair of valves each movable by fluid under pressure acting thereagainst from said source from a first to a second position respectively blocking flow through or opening its respective conduit means, yieldable force transmitting means operably connecting said valves for transmitting the movement of one to the other at times, the fluid in said first conduit means acting on one of said valves moving it to its second position, and selectively operable means for selectively directing fluid under pressure from said source to act on the other of said valves to move it to its second position, the latter movement of said other valve effecting a return movement of said one valve to its first position to temporarily block flow to said supply line, the subsequent build-up in pressure in said conduit means upon continued rotation of said source moving said one valve again to its second position.

7. A fluid pressure control system, comprising, an actuatable means biased to one position and movable by fluid under pressure acting thereon to a second position, a fluid supply line, a rotatable source of fluid under pressure providing an output fluid pressure that varies as a function of its speed of rotation, first and second conduit means respectively connecting said source to said supply line and actuatable means, and valve means in said conduit means for controlling the flow of fluid to said supply line and actuatable means, said valve means including a pair of axially aligned spring separated shift valves each movable towards the other by fluid under pressure acting thereagainst from said source from a first to a second position respectively blocking flow through or opening its respective conduit means, the fluid from said source acting on one of said valves moving it to its second position, and means moving the other of said valves to its second position, the latter movement of said other valve effecting a return movement of said one valve to its first position to temporarily block flow through its respective conduit means, the subsequent build-up in pressure in said latter conduit means upon continued rotation of said source moving said one valve again to its second position.

8. A fluid pressure control system, comprising, an actuatable means biased to one position and movable by fluid under pressure acting thereon to a second position, a fluid supply line, a rotatable source of fluid under pressure providing an output fluid pressure that varies as a function of its speed of rotation, first and second conduit means respectively connecting said source to said supply line and actuatable means, and valve means in said conduit means for controlling the flow of fluid to said supply line and actuatable means, said valve means including a pair of axially aligned spring separated shift valves each movable towards the other by fluid under pressure acting thereagainst from said source from a first to a second position respectively blocking flow through or opening its respective conduit means, the fluid from said source acting on one of said valves moving it to its second position, and selectively operable means for selectively directing fluid under pressure from said source to act on the other of said valves to move it to its second position, the latter movement of said other valve effecting a return movement of said one valve to its first position to temporarily block flow through its respective conduit means, the subsequent build-up in pressure in said latter conduit means upon continued rotation of said source moving said one valve again to its second position.

9. A fluid pressure control system, comprising, an actuatable means biased to one position and movable by fluid under pressure acting thereon to a second position, a fluid supply line, a rotatable source of fluid under pressure providing an output fluid pressure that varies as a function of its speed of rotation, first and second conduit means respectively connecting said source to said supply line and actuatable means, and valve means in said conduit means for controlling the flow of fluid to said supply line and actuatable means, said valve means including a pair of axially aligned spring separated valves each movable towards the other by fluid under pressure from said source acting against a portion thereof and each movable from a first to a second position respectively blocking flow through or opening its respective conduit means, one of said valves comprising a pressure regulating valve movable by the fluid from said source acting on the end thereof to its second regulating position, and selectively operable means for selectively directing fluid under pressure from said source to act on the other of said valves to move it to its second position, said other valve constituting a shift valve, the latter movement of said shift valve acting through said spring effecting a return movement of said regulating valve to its first position to temporarily block flow to said supply line, the subsequent build-up in pressure in said conduit means upon continued rotation of said source moving said regulating valve again to its regulating position.

10. A fluid pressure control system, comprising, an actuatable means biased to one position and movable by fluid under pressure acting thereon to a second position, a fluid supply line, a rotatable source of fluid under pressure providing an output fluid pressure that varies as a function of its speed of rotation, first and second conduit means respectively connecting said source to said supply line and actuatable means, and flow control means in said conduit means for controlling the flow of fluid to said supply line and actuatable means, said control means including a first valve means having opposite end portions movable by fluid under pressure acting thereagainst from said source from a first to a second position blocking flow through or opening said first conduit means, yieldable force transmitting means operably connecting said valve means portions for transmitting the movement of one to the other at times, the fluid in said first conduit means acting on one portion of said valve means moving it to its second position, flow on-off control means in said second conduit means selectively movable to control the flow therethrough to said actuatable means, the fluid in said second conduit means also acting against the opposite end portion of said valve means moving the opposite end portion to its second position, the latter movement of said opposite valve means portion upon movement of said on-off control means to flow fluid through said second conduit means effecting a return movement of said one valve to its first position to temporarily block flow to said supply line, the subsequent build-up in pressure in said conduit means upon continued rotation of said source moving said one valve again to its second position 11. A fluid pressure control system for use in a motor vehicle, comprising, a reciprocatable actuatable means movable by fluid under pressure acting thereon in one direction to one position, means biasing said actuatable means in the opposite direction to a return second position, a rotatable source of fluid under pressure, conduit means connecting said source to said actuatable means, and a shift valve in said conduit means for controlling the flow of fluid to said actuatable means, said valve being movable from a first to a second position blocking flow through or opening said conduit means, means moving said valve to its second position, vent line means connected to said conduit means, said valve in said one position connecting said conduit means to said vent line and in said second position blocking said vent line, and means in said vent line movable to restrict said vent line and vary the return movement of said actuable means when said valve moves to its first position connecting said actuatable means and said vent line.

12. A fluid pressure control system for use in a motor vehicle, comprising, a reciprocatable actuatable means movable by fluid under pressure acting thereon in one direction to one position, means biasing said actuatable means in the opposite direction to a return second position, a rotatable source of fluid under pressure, conduit means connecting said source to said actuatable means, and a shift valve in said conduit means for controlling the flow of fluid to said actuatable means, said valve being movable from a first to a second position blocking flow through or opening said conduit means, means moving said valve to its second position, vent line means connected to said conduit means, said valve in said one position connecting said conduit means to said vent line and in said second position blocking said vent line, and valve means in said vent line movable to restrict said vent line and vary the return movement of said actuatable means when said shift valve moves to its first position connecting said actuatable means and said vent line.

13. A fluid pressure control system for use in a motor vehicle having an engine and a torque demand control accelerator pedal, comprising, a reciprocatable actuatable means movable by fluid under pressure acting thereon in one direction to one position, means biasing said actuatable means in the opposite direction to a return second position, a rotatable source of fluid under pressure, conduit means connecting said source to said actuatable means, and a shift valve in said conduit means for controlling the flow of fluid to said actuatable means, said shift valve being movable from a first to a second position blocking flow through or opening said conduit means, means moving said valve to its second position, vent line means connected to said conduit means, said valve in said one position connecting said conduit means to said vent line and in said second position blocking said vent line, and valve means in said vent line movable in response to changes in engine torque demand to restrict said vent line and vary the return movement of said actuatable means when said shift valve moves to its first position connecting said actuatable means and said vent line.

14. A fluid pressure control system for use in a motor vehicle having an engine and an engine torque demand control accelerator pedal, comprising, a reciprocatable actuatable means movable by fluid under pressure acting thereon in one direction to one position, means biasing said actuatable means in the opposite direction to a return second position, a rotatable source of fluid under pressure, conduit means connecting said source to said actuatable means, and a shift valve in said conduit means for controlling the flow of fluid to said actuatable means, said shift valve being movable from a first to a second position blocking flow through or opening said conduit means, means moving said valve to its second position, vent line means connected to said conduit means, said shift valve in said one position connecting said conduit means to said vent line and in said second position blocking said vent line, said vent line having a portion containing a flow restriction means and a portion bypassing said restriction means, and vent control means operably movable in response to changes in engine torque demand between positions directing flow through said flow restriction portion or said bypass portion to control the return movement of said actuatable means when said shift valve moves to its first position.

15. A fluid pressure control system for use in a motor vehicle having an engine providing a source of intake manifold vacuum and a torque demand control accelerator pedal, comprising, a reciprocatable actuatable means movable by fluid under pressure acting thereon in one direction to one position, means biasing said actuatable means in the opposite direction to a return second position, a rotatable source of fluid under pressure, conduit means connecting said source to said actuatable means, and a shift valve in said conduit means for controlling the flow of fluid to said actuatable means, said shift valve being movable from a first to a second position blocking flow through or opening said conduit means, means moving said valve to its second position, vent line means connected to said conduit means, said shift valve in said one position connecting said conduit means to said vent line and in said second position blocking said vent line, said vent line having a portion containing a flow restriction means and a portion bypassing said restriction means, and vent control means operably movable in response to changes in engine torque demand between positions directing flow through said flow restriction portion or said bypass portion to control the return movement of said actuatable means when said shift valve moves to its first position, said vent control means comprising a valve movable between positions alternately blocking flow through said restriction means containing portion and said bypass portion, and means operably connecting said vent control valve to said engine intake manifold vacuum whereby said latter valve is movable to said positions in response to changes in vacuum upon changes in torque demand.

16. A fluid pressure control system for use in a motor vehicle having an engine providing a source of intake manifold vacuum, comprising, a reciprocatable actuatable means movable by fluid under pressure acting thereon in one direction to one position, means biasing said actuable means in the opposite direction to a return second position, a rotatable source of fluid under pressure, conduit means connecting said source to said actuatable means, and a shift valve in said conduit means for controlling the flow of fluid to said actuatable means, said shift valve being movable from a first to a second position blocking flow through or opening said conduit means, means moving said valve to its second position, vent line means connected to said conduit means, said shift valve in said one position connecting said conduit means to said vent line and in said second position blocking said vent line, said vent line having a portion containing a flow restriction means and a portion bypassing said restriction means, and vent control means operably movable in response to changes in engine intake manifold vacuum between positions directing flow through said flow restriction portion or said bypass portion to control the return movement of said actuatable means when said shift valve moves to its first position, said vent control means comprising a valve variably movable between positions alternately blocking flow through said restriction means containing portion and said bypass portion, and means operably connecting said vent control valve to said engine intake manifold vacuum whereby said latter valve is variably movable between said positions in response to changes in vacuum upon changes in torque demand.

17. A control system as in claim 1, including, vent line means connected to said second conduit means, said shift valve in one position connecting said second conduit means to said vent line, means in said vent line movable to restrict said vent line and vary the return movement of said actuatable means when said valve moves to its first position connecting said actuatable means and said vent line.

18. A control system as in claim 2, including vent line means connected to said second conduit means, said shift valve in one position connecting said second conduit means to said vent line, valve means in said vent line movable to restrict said vent line and vary the return movement of said actuatable means when said shift valve moves to its first position connecting said actuatable means and said vent line.

19. A control system as in claim 3, including vent line means connected to said second conduit means, said shift valve in one position connecting said second conduit means to said vent line, valve means in said vent line movable in response to changes in engine torque demand to restrict said vent line and vary the return movement of said actuatable means when said shift valve moves to its first position connecting said actuatable means and said vent line.

20. A control system as in claim 7, including vent line means connected to said second conduit means, said shift valve in one position connecting said second conduit means to said vent line, said vent line having a portion containing a flow restriction means and a portion bypassing said restriction means, and vent control means operably movable in response to changes in engine torque demand between positions directing flow through said flow restriction portion or said bypass portion to control the return movement of said actuatable means.

21. A fluid pressure control system, comprising, an actuatable means biased to one position and movable by fluid under pressure acting thereon to a second positon, a fluid supply line, a rotatable source of fluid under pressure providing an output fluid pressure that varies as a function of its speed of rotation, first and second conduit means respectively connecting said source to said supply line and actuatable means, and flow control means in said conduit means for controlling the flow of fluid to said supply line and actuatable means, said control means including a pair of valves each movable by fluid under pressure acting thereagainst from said source from a first to a second position respectively blocking flow through or opening its respective conduit means, yieldable force transmitting means operably connecting said valves for transmitting the movement of one to the other at times, the fluid in said first conduit means acting on one of said valves moving it to its second position, and selectively operable means for selectively directing fluid under pressure from said source to act on the other of said valves to move it to its second position, the latter movement of said other valve effecting a return movement of said one valve to its first position to temporarily block flow to said supply line, the subsequent build-up in pressure in said conduit means upon continued rotation of said source moving said one valve again to its second position, vent line means connected to said second conduit means, said shift valve in one position connecting said second conduit means to said vent line, and valve means in said vent line movable to restrict said vent line and vary the return movement of said actuatable means when said shift valve moves to its first position connecting said actuatable means and said vent line.

22. A fluid pressure control system, comprising, an actuatable means biased to one position and movable by fluid under pressure acting thereon to a second position, a fluid supply line, a rotatable source of fluid under pressure providing an output fluid pressure that varies as a function of its speed of rotation, first and second conduit means respectively, connecting said source to said supply line and actuatable means, and valve means in said conduit means for controlling the flow of fluid to said supply line and actuatable means, said valve means including a pair of axially aligned spring separated valves each movable towards the other by fluid under pressure from said source acting against a portion thereof and each movable from a first to a second position respectively blocking flow through or opening its respective conduit means, one of said valves comprising a pressure regulating valve movable by the fluid from said source acting on the end thereof to its second regulating position, and selectively operable means for selectively directing fluid under pressure from said source to act on the other of said valves to move it to its second position, said other valve constituting a shift valve, the latter movement of said shift valve acting through said spring effecting a return movement of said regulating valve to its first position to temporarily block flow to said supply line, the subsequent build-up in pressure in said conduit means upon continued rotation of said source moving said regulating valve again to its regulating position, vent line means connected to said second conduit means, said shift valve in one position connecting said second conduit means to said vent line, and valve means in said vent line movable in response to changes in engine torque demand to restrict said vent line and vary the return movement of said actuatable means when said shift valve moves to its first position connecting said actuatable means and said vent line.

23. A fluid pressure control system, comprising, an actuatable means biased to one position and movable by fluid under pressure acting thereon to a second position, a fluid supply line, a rotatable source of fluid under pressure providing an output fluid pressure that varies as a function of its speed of rotation, first and second conduit means respectively connecting said source to said supply line and actuatable means, and flow control means in said conduit means for controlling the flow of fluid to said supply line and actuatable means, said control means including a first valve means having opposite end portions movable by fluid under pressure acting thereagainst from said source from a first to a second position blocking flow through or opening said first conduit means, yieldable force transmitting means operably connecting said valve means portions for transmitting the movement of one to the other at times, the fluid in said first conduit means acting on one portion of said valve means moving it to its second position, flow on-off control means in said second conduit means selectively movable to control the flow therethrough to said actuatable means, the fluid in said second conduit means also acting against the opposite end portion of said valve means, moving the opposite end portion to its second position, the latter movement of said opposite valve means portion upon movement of said on-off control means to flow through said second conduit means effecting a return movement of said one valve to its first position to temporarily block flow to said supply line, the subsequent build-up in pressure in said conduit means upon continued rotation of said source moving said one valve again to its second position, vent line means connected to said second conduit means, said shift valve in one position connecting said second conduit means to said vent line, said vent line having a portion containing a flow restriction means and a portion bypassing said restriction means, and vent control means operably movable in response to changes in engine torque demand between positions directing flow through said flow restriction portion or said bypass portion to control the return movement of said actuatable means.

24. A fluid pressure control system, comprising, an actuatable means biased to one position and movable by fluid under pressure acting thereon to a second position, a fluid supply line, a rotatable source of fluid under pressure providing an output fluid pressure that varies as a function of its speed of rotation, first and second conduit means respectively connecting said source to said supply line and actuatable means and flow control means in said conduit means for controlling the flow of fluid to said supply line and actuatable means, said control means including a first valve means having opposite end portions movable by fluid under pressure acting thereagainst from said source from a first to a second position blocking flow through or opening said first conduit means, yieldable force transmitting means operably connecting said valve means portions for transmitting the movement of one to the other at times, the fluid in said first conduit means acting on one portion of said valve means moving it to its second position, flow on-off control means in said second conduit means selectively movable to control the flow therethrough to said actuatable means, the fluid in said second conduit means also acting against the opposite end portion of said valve means, moving the opposite end portion to its second position, the latter movement of said opposite valve means portion upon movement of said on-off control means to flow fluid through said second conduit means effecting a return movement of said one valve to its first position to temporarily block flow to said supply line, the subsequent build-up in pressure in said conduit means upon continued rotation of said source moving said one valve again to its second position, vent line means connected to said second conduit means, said shift valve in one position connecting said second conduit means to said vent line, said vent control means comprising a valve variably movable between positions alternately blocking flow through said restriction means containing portion and said bypass portion, and means operably connecting said vent control valve to said engine intake manifold vacuum whereby said latter valve is variably movable between said positions in response to changes in vacuum upon changes in torque demand.

25. A control mechanism for controlling the operation of a spring engaged clutch in the driveline of a motor vehicle having an engine, a gearshift control lever, and an operator controllable torque demand mechanism, including, a fluid pressure actuatable means moving said clutch to a disengaged position, an engine oil and lubrication line, an engine driven oil pump providing an output fluid under pressure that varies as a function of its speed of rotation, first and second conduit means respectively connecting said pump to said engine oil and lubrication line and to said actuatable means, and flow control means in said conduit means for controlling the flow of fluid to said lubrication line and actuatable means, said control means including a pair of valves each movable by fluid under pressure acting thereagainst from said pump from a first to a second position respectively blocking flow through or opening its respective conduit means, yieldable force transmitting means operably connecting said valves for transmitting the movement of one to the other at times, the fluid in said first conduit means acting on one of said valves moving it to its second position, and means moving the other of said valves to its second position, the latter movement of said other valve effecting a return movement of said one valve to its first position to temporarily block flow to said lubrication line, the subsequent build-up in pressure in said conduit means upon continued rotation of said pump moving said one valve again to its second position, said means moving the other of said valves including a third selectively movable open-close pilot valve controlling flow from said source to an end portion of said second valve through a third conduit means, and means moving said third valve to effect movement of said second valve by the fluid pressure acting thereon in said third conduit means, said means for moving said third valve including a solenoid, and gearshift lever mounted operator controlled switch means to activate said solenoid to move said pilot valve to open said third conduit means, vent line means connected to said second conduit means, said shift valve in one position connecting said second conduit means to said vent line, said vent control means comprising a valve variably movable between positions alternately blocking flow through said restriction means containing portion and said bypass portion, and means operably connecting said vent control valve to said engine intake manifold vacuum whereby said latter valve is variably movable between said positions in response to changes in vacuum upon changes in torque demand.

References Cited

UNITED STATES PATENTS

| | | | |
|---|---|---|---|
| 1,608,277 | 11/1926 | Guernsey | 192—91 |
| 2,756,851 | 7/1956 | Collins | 192—3.5 X |
| 2,877,668 | 3/1959 | Kelbel | 74—788 |
| 2,893,526 | 7/1959 | Smirl | 192—3.5 X |
| 3,217,846 | 11/1965 | Smirl | 192—.092 |
| 3,251,439 | 5/1966 | Randol | 192—3.5 |

MARK NEWMAN, *Primary Examiner.*

ARTHUR T. McKEON, *Examiner.*